Sept. 9, 1969  R. H. KOLB  3,466,532
METHOD FOR DETERMINING THE DIP OF SUBTERRANEAN
EARTH FORMATIONS
Filed June 22, 1967  3 Sheets-Sheet 1
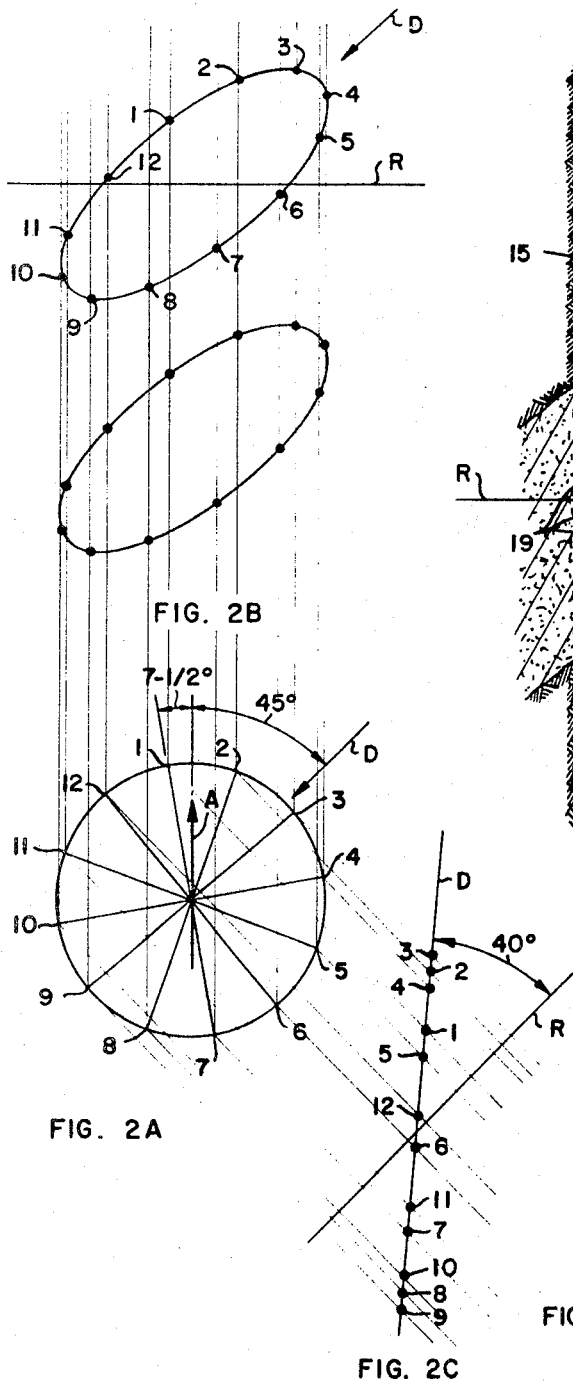
FIG. 2B
FIG. 2A
FIG. 2C
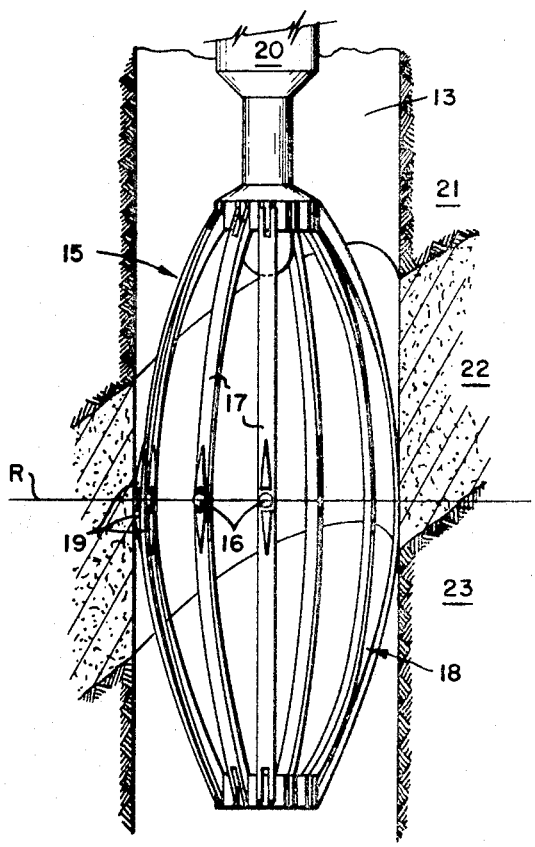
FIG. 3
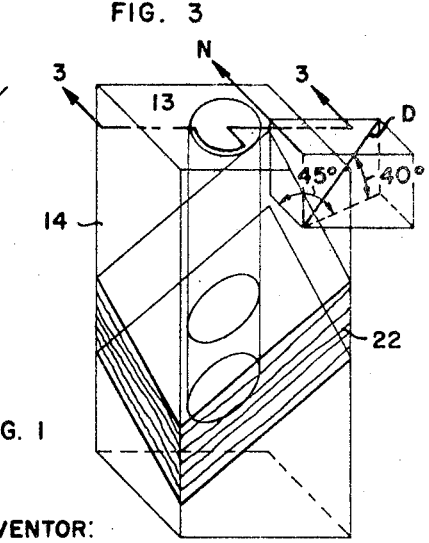
FIG. 1
INVENTOR:
ROBERT H. KOLB
BY: J. H. McCarthy
HIS AGENT Sept. 9, 1969  R. H. KOLB  3,466,532
METHOD FOR DETERMINING THE DIP OF SUBTERRANEAN
EARTH FORMATIONS
Filed June 22, 1967  3 Sheets-Sheet 2

INVENTOR:
ROBERT H. KOLB
BY: J. H. McCarthy
HIS AGENT

INVENTOR:
ROBERT H. KOLB
BY: *J. H. McCarthy*
HIS AGENT

United States Patent Office 3,466,532
Patented Sept. 9, 1969

3,466,532
METHOD FOR DETERMINING THE DIP OF SUBTERRANEAN EARTH FORMATIONS
Robert H. Kolb, Cypress, Tex., assignor to Shell Oil Company, New York, N.Y., a corporation of Delaware
Filed June 22, 1967, Ser. No. 648,163
Int. Cl. G01v 3/18
U.S. Cl. 324—1                         2 Claims

ABSTRACT OF THE DISCLOSURE

Electronic data indicative of the penetration angle of a borehole relative to earth formation bedding planes may be interpreted directly from a planar visual display of such data as an orthographic elevational projection of a plurality of sensing points around the periphery of the borehole which lie in a common plane parallel with the dip plane of a respective earth stratum.

---

The present invention relates to the determination of the dip angle and azimuthal direction of earth strata traversed by a borehole drilled therein.

More particularly, this invention is concerned with a novel method of displaying the raw data received from geologic characteristic sensors whereby the recognition of a significant characteristic of a geologic formation against a background of considerable recording noise is facilitated.

It has been the practice of the prior art to determine the relative angle between an earth penetrating borehole and particular earth strata by moving a tool having three or more sensors mounted in a common plane that is normal to the borehole axis along said borehole axis in the manner generally described by U.S. Patent No. 2,427,950. Since each sensor transmits an electrical signal proportional to a characteristic physical property of the formation on a respective channel through a connecting conductor to surface-located receiver equipment and this signal varies observably when passing an interface between two dissimilar earth formations, it is possible to correlate the receipt of such signals to the depth of the respective transmitting sensor at the moment of transmission. In this manner, three points are fixed in space which define the bedding plane. By analytically processing such data, usually by means of a computer, the dip and strike of a formation bedding plane may be determined.

It will be noted that the signals responsive to a particular sensor are usually recorded graphically by a marking stylus on a strip of paper moving past the stylus at some linear speed that that is proportional to the speed at which the sensor passes along the borehole, the stylus making inflections about a base line that is parallel with the direction of movement of the recording paper. The degree of excursion of the stylus from the base line is proportional to the geologic property to which the sensor is sensitive. Although many mechanical devices have been proposed for determining from such raw data the exact position at which a significant electronic event occurs, such as when passing from one formation strata to another, the most effective method yet used is visual observation by a skilled interpreter. The process of such interpretation generally includes the side by side alignment of the graphic records produced by the three or more sensors and mentally comparing those inflections having similar characteristics. Those having skill in this art will appreciate, however, that such raw data is often obscured by continuous random background noise which makes the picking of significant signal events extremely difficult. Contributing further to interpretation difficulties is the fact that when data is presented in the single plane of a recording strip, the geometry of the traces bears only an abstract developed relationship to that of longitudinal traces along the wall of a cylinder penetrating a plane which is the actual case. In other words, the strip records from each sensor are equally spaced across the reading plane in the same sequential order as the sensors have relative to each other around the periphery of the borehole. Consequently, any pattern that might appear from such a display due to the respective sensors passing a common geological event at respective depths is abstract and remote from a pictorial display of such data so one might envision it in a three dimensional perspective. Hence, the lack of any meaningful pattern compounded with the very subtle distinctions from the background noise renders the task of deciphering significant data from the record a difficult one at best.

It is therefore, an object of this invention to provide a method of presenting borehole mapping records in such a manner as to furnish a pictorial display of significant geologic formation indications of characteristics.

It is also the object of this invention to facilitate the visual interpretation of borehole mapping records by presenting such records to the eye of the observer in a true projection plane of the borehole whereby significant data is more readily noticed as a meaningful geometric pattern.

These and other objects are achieved in the manner of the invention by constructing a borehole mapping tool having a plurality of geologic characteristic sensor elements disposed around the periphery of the tool in a common plane that is normally transverse to the tool axis which should be coincident with the axis of the borehole in which the tool is to be operated. The sensor elements are caused to emit electrical signals proportional to predetermined geologic characteristics as the tool is moved axially along the borehole. The signals from each sensor are recorded along with co-relative depth and orientational data on respective information carrier channels by receiving equipment located on the earth surface. Such information is then visually displayed on a viewing plane showing the impulses from respective sensors as generally parallel, laterally aligned lines in the same sequential order from left to right across the viewing plane as normally parallel projections of the sensor position points would appear on an orthographic plane normal to the common plane of the sensors.

Further objects of the present invention will be understood from the following description taken with regard to the drawings wherein:

FIGURE 1 is a transparent pictorial representation of a section of earth having a borehole extending axially therethrough and traversed by a strata section having different characteristics than those sections both above and below.

FIGURE 2A is a schematic graphic display of the reference plane containing sensor elements.

FIGURE 2B is an elevational projection of the borehole as viewed along the reference direction A in FIGURE 2A showing the points at which the respective sensors pass the interface between two different and adjacent earth strata.

FIGURE 2C is an elevational projection of the borehole as seen from a direction 45° counterclockwise from the viewing direction of FIGURE 2B.

FIGURE 3 is a vertical sectional view of a portion of the borehole being surveyed in accordance with the teachings of my invention.

Figures 4, 4A:
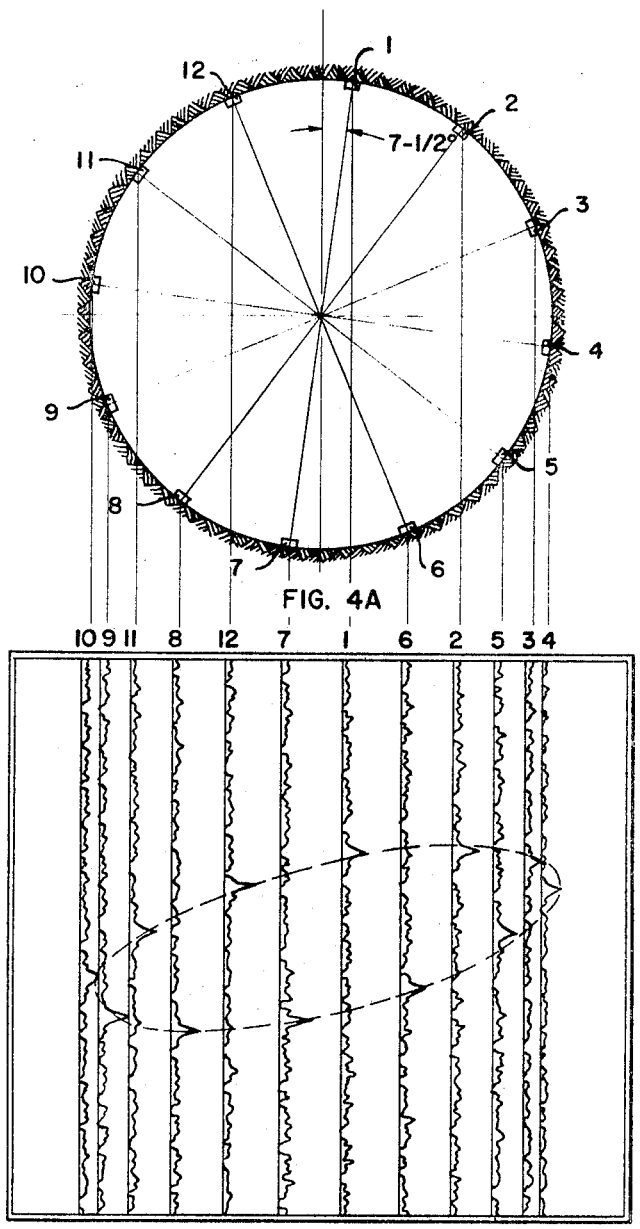
FIGURE 4 is a pictorial reproduction of an actual data display plane acording to the invention.
FIGURE 4A is a plan view of the borehole showing the respective positions of the sensors correlative to the sequential order of the signal trace lines illustrated in the display plane of FIGURE 4.

The apparatus and method of this invention may generally be as described in U.S. Patent No. 2,427,950, with notable exceptions as described hereinbelow. Consider a section of earth as represented by FIGURE 1 having a borehole 13 drilled vertically therethrough. The particular section of earth selected, designated generally by reference numeral 14, is traversed by a strata 22 of chart for example, having a dip angle of 40° along a 315° strike azimuth, as represented by the arrow D which lies in the same plane as the top surface of the strata 22 and directed along the dip line thereof. These latter factors are unknown, of course, prior to the borehole survey and are the data sought. According to the prior art as described in said U.S. Patent No. 2,427,950, this data may be determined by placing three or more sensing elements in a vertically movable common reference plane that is generally transverse to the axis of the borehole. The sensors are usually equally spaced around a circle concentric with the borehole wall and in close proximity thereof. Suitable earth formation characteristics to which the sensor may be responsive and provide relative indications thereof as between respective formation strata are magnetic permeability, electrical resistivity or acoustical properties, for example.

It will be envisioned, therefore, that as the reference plane of the sensors is moved longitudinally with respect to the borehole axis, down, for example, one or never more than two of the sensors will encounter the tilted formation strata 22 first and transmit an electrical signal of such engagement on its respective conductor wire or frequency channel through an electrical conductor to the surface. Receiving equipment located at the surface responds to the electrical signal to record it on some media such as a moving strip chart simultaneously with an indication of the depth at which the sensor was positioned at the moment of signal emission. As the reference plane is lowered further, a second or third sensor will encounter the strata 22 and transmit a signal which is recorded, accordingly. By processing this data along with the known circular periphery size on which the sensors are disposed and the azimuth orientation of at least one of the sensors relative to the borehole center which is also recorded at the same time that the other recorded data is taken, it is possible to analytically determine the exact angle, both dip and strike, which the strata 12 has at location of the borehole 13.

The accuracy and reliability at which this determination may be made is largely relative to the ability of the individual person who aligns the record charts from each sensor side by side in the order of their sequence around the reference plane periphery to distinguish those events on the record that are significant from the high level of "noise" appearing therewith. The individual evaluator bases such a discrimination on the visual pattern certain similar inflections on the record make across the viewing plane, a single point in the pattern appearing on each record line made by a respective sensor. There is no predetermined shape such a pattern may take, however, since this is relative to the dip and strike of the strata and the azimuth orientation the sensors may have at the moment of encountering the given strata. For example, if the strata is lying in the same plane as the sensors, the significant inflections on each record strip will describe a straight line pattern transversely across the several record strips. If the strata is lying at an angle to the reference plane of the sensors and the azimuth orientation of said sensors relative to the dip of the strata is such that two sensors encounter the strata at the same time, the inflections appearing on the record strips respective to these same sensors will appear as a transverse line through these two strips but the inflection from a third sensor respective to the same strata will appear further down on the record at a distance relative to the depth at which the third sensor encountered the strata. Hence, it may be seen that such irregular patterns are difficult to discern when the inflections forming such patterns are only subtly distinguishable from the recorded noise present therewith.

Although the provision of a greater number of sensors around the periphery of the reference plane certainly improves the continuity of a meaningful pattern of significant inflection points, there, nevertheless, is little regularity in the shape such patterns may take when the record strips from the sensors are laid out in the same sequence as they have around the reference plane periphery and laterally spaced apart at equal distances from each other on the viewing plane. Furthermore, such patterns as may sppear from such a display have only a remote and abstract relation to the eye of the viewer as compared to the pictorial representation of the given strata crossing the borehole that the viewer may entertain if he could see the actual structure transparently.

By the method of the present invention, therefore, the mapping tool, generally identified in FIGURE 3 by reference numeral 15, is provided with a relatively large number of sensors 16 mounted on bow springs 17 forming a cage 18. Each of the sensors 16 is provided with protective projections or bumpers 19 which allow the springs 17 to push the sensors 16 out to close proximity of the wall of borehole 13 but prevent actual contact therewith. The upper end of the spring cage is secured to a tool barrel 20 which contains necessary amplification and orientation sensing means. The upper end of the tool barrel 20 is then secured to a cable, not shown, which extends up the borehole to the surface by which the mapping tool 15 is positioned within the borehole. The sensors are provided with electrical conductors, not shown, which conduct original signals to the amplifier which relays the same information to the surface usually on a single conductor cable 25 as shown in FIGURE 5, where it is received by appropriate receiving and recording equipment.

Figure 5:
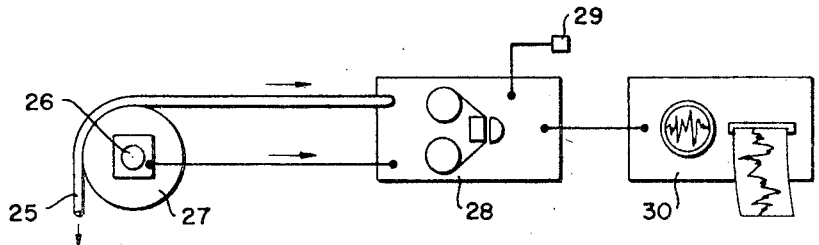
FIGURE 5 is a schematic of field recording equipment which may be used with the invention.

A suitable field recording system may be such as that schematically illustrated in FIGURE 5 which includes a well depth transmitter 26 driven by a measuring sheave 27. The single conductor cable 25 is caused to pass over, thereby turning, the sheave 27 which operates the transmitter 26 to transmit a signal proportional to the downhole length of the cable 25. By this means the depth of the mapping tool 15 is continuously monitored. The depth data from the transmitter 26 as well as the signals from sensors 16 and other pertinent downhole data is recorded by a magnetic tape recorder 28. It may also be desirable to include an audio cueing channel on the record which records transmissions from a microphone 29. So the field operator may monitor the composite or any particular one of the recorded signals, oscilloscope and/or graphical recording equipment 30 may be provided to also receive the raw field data.

Figure 6:
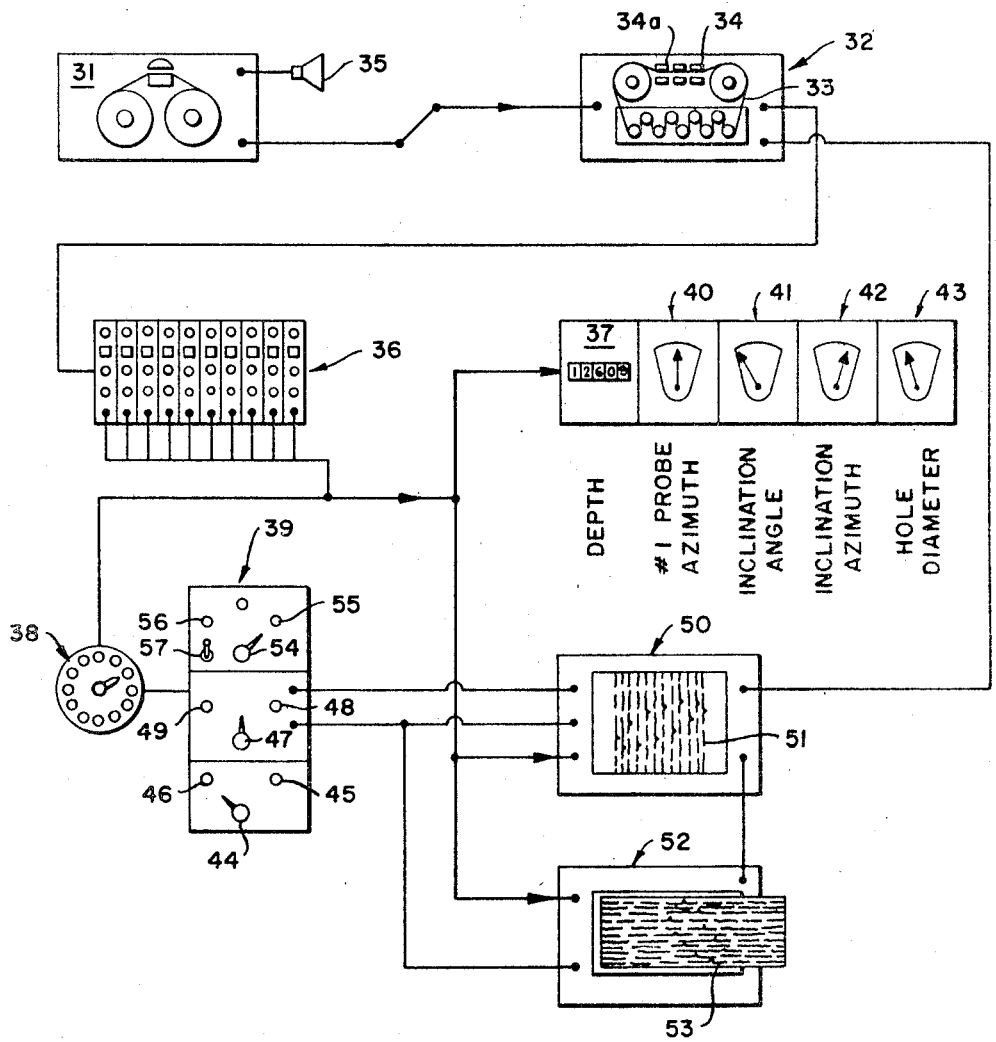
FIGURE 6 is a schematic of a data processing system which may be used with the invention.

Subsequent to recording, the taped data is reprocessed through a data control system which may be as that illustrated in FIGURE 6 wherein each channel of information is prepared for selective presentation. Depth data, caliper data and tool orientation information are displayed on a panel by means of numerical registers and/or meters and the sensor signals are presented in a pictorial array on a large screen multi-channel display oscilloscope 51. The same sensor data is also fed to a multichannel graphical recorder 53 where portions of the log selected and arranged on the basis of the oscilloscope display can be recorded in a permanent form.

Data from the originally recorded magnetic tape is transmitted from a playback unit 31 and passes directly to a memory unit 32 where it is re-recorded on a drum or closed loop tape 33. The playback unit 31 is also provided with a speaker 35 from which the audio cueing signals may be heard. Playback heads 34 are located immediately adjacent to the erase of recording heads 34a of the memory unit so that the re-recorded data is reproduced again with minimum time delay. Whenever a moving display is to be presented on the oscilloscope 51, re-recording and playback will be continuous. At any time that an interesting feature appears on the moving display both the playback unit 31 and the erase and record sections of the memory unit 32 can be shut down at the end of a display sweep and the entire previous display frame will be repeated over and over again from the data retained on the drum or closed loop 33 between the playback and erasure points.

From the memory unit 32, the frequency modulated composite signal passes to a carrier separation and demodulation unit 36 while numerically coded depth data goes directly to the depth display register 37 and also to the display unit 50 and the recording unit 52. From the demodulation unit 36 the sensor signals go to the display and recording units 50 and 52 through trace rotation and the display selector switch units 38 and 39, while the instrument orientation and caliper data signals go to their respective display meters 40–43. The display unit 50 should be set up to sweep vertically from the bottom to the top with the sweep synchronized with the cycling of the memory unit loop 33. During a moving display, each successive frame on the display unit 50 will present data representative of successive segments of the borehole with the bottom of each frame beginning where the top of the previous one left off.

When an interesting data pattern is observed during the course of a sweep, the operator can operate a display selector switch 44 to the "stationary" position 45 which will shut down the playback unit 31 and the erase and record sections of the memory unit 32. The display unit 50 will then repeat continuously this last frame which is stored on the memory tape 33. When desired, a moving display can be re-established by restoring the selector switch to the "moving" position 46.

To optimize the stationary display of any particular stored event on the display unit 50, means should be provided to make any or all of the following display adjustments:

(1) Expansion of any chosen section of a complete frame to occupy a larger portion of the screen 51 or to correspond to a given depth scale.

(2) Variation of the transverse spacing of the traces according to caliper data to provide a true scale presentation or to move the traces into closer proximity for easier visual correlation.

(3) Alteration of the display type by means of a display selector switch 47 from a "developed" display of equally spaced traces in consecutive order to a "projected" display of traces spaced and ordered according to an orthographically projected elevation of the borehole cylinder as described further hereinbelow.

(4) Rotation of the "projected" display by means of the trace rotation switch 38 or changing the beginning trace of the "developed" display to present the data pattern in its most recognizable form.

(5) Blanking, by means of a two-way, momentary contact blanking selector switch 54, either the back or front traces of the projected cylinder in a "projected" display.

(6) Identification of the No. 1 or reference trace by means of a momentary contact reference trace blanking switch 57.

Once the optimum display has been selected, a permanent record 53 can be reproduced by the recording unit 52 during a single sweep of the display. This unit may be either a pen or heated stylus multiple galvanometer recorder or a dry process photographic recorder using optical galvanometers.

Turning now to the operation of the above-described equipment to produce the desired pictorial display, reference is made to FIGURE 2A showing a plan view of the reference plane containing the sensing elements 16 of FIGURE 3. Each sensor is assigned a respective reference numeral from 1 to 12 consecutively clockwise. For a "projected" display of the signals from the sensor upon passing a geological event such as the interface between strata 21 and 22 in FIGURE 3 as the reference plane R moves axially along the borehole, the base lines of the traces finally appearing on the display or recording units 50 and 52 are laterally spaced across the viewing plane of these units at distances proportional to the distances between the projected construction lines between FIGURES 2A and 2B or 2A and 2C. The angle that an arbitrary reference direction A of the tool 15 has with respect to the magnetic north direction is continuously monitored by equipment mounted in the instrument barrel 20 and is ultimately displayed on the orientation display meter 40. The function served by angularly offsetting the sequence of the sensor locations from the viewing direction is to give each sensor a distinctive and laterally distinguishable position in the projected elevation from its complimentary sensor that is substantially diametrically opposite the first sensor. In other words, if a series of chords was drawn between respective sensors on opposite sides of a diameter that is perpendicular of the reference direction A, the said chords then being parallel to the reference direction, the trace lines appearing on the display unit 50 from two sensors subtending each chord would be superimposed on a single base line, thereby obscuring the individuality of each trace line. By offsetting the sequence of the regularly spaced sensors some odd angle, 7½°, for example from the reference direction, a separate chord from each sensor drawn across the reference plane parallel to the reference direction will appear in the projection plane taken perpendicular to the reference direction as a point distinct from all other chords. This is illustrated in FIGURES 2B and 2C by the fact that no two sensor points fall on the same construction line. When the signals from each sensor are transcribed on the display unit 50, the base lines for the respective traces are arranged across the viewing plane of the oscilloscope from left to right in the same sequential order and relative lateral spacing as the construction lines between FIGURES 2A and 2B. In the case of a viewing plane coincident with the reference direction A as dictated by the trace rotation switch, the sequence of trace lines by the sensor signals would be laterally aligned from left to right across the plane of the display unit in the order of 10, 11, 9, 12, 8, 1, 7, 2, 3, 5 and 4, the numbers referring to the sensors which emit the signals making the respective trace lines on the display unit.

As the reference plane of FIGURE 2A is drawn up the borehole 13, the No. 9 sensor encounters the interface between strata 21 and 22 first at its lowermost unit point within the borehole and the resulting sensor signal is ultimately shown on the display unit 50 as an inflection on its respective trace line. The sensor No. 8 encounters the strata interface next and reflects this fact on its respective trace line. The third sensor to encounter the strata interface is No. 10 which is dislpayed accordingly. In this order the trace signals from the respective sensors around the periphery of the reference plan R describe an elliptical pattern across the face of the display unit 50 in the same manner as an orthographic elevational projection of the line of intersection between the borehole cylinder 13 and the interfacial plane between strata 21 and 22 would appear in a viewing plane perpendicular to the reference direction A. Such an orthographic projection is illustrated in FIGURE 2B which shows an elliptical loci of points 1–12 around the reference plane R shown in plan in FIGURE 2A. The elliptical loci of FIGURE 2B describes the line of intersection of the interfacial plane between strata 21 and 22 of FIGURE 3 as represented by the arrow D with the cylinder of the borehole 13. A similar portrayal is shown in FIGURE 4 which shows the trace lines made by the respective sensor signals as they would actually appear on the display or recording units 50 or 52.

By means of the trace rotation switch 38, the reference trace, i.e., the direction of viewing the elevational projection of the borehole, may be selectively changed to any position relative to the reference direction A within the limits imposed by the finite number of switch positions available. The effect of shifting the reference trace is to change the position of the viewer with respect to the borehole so that, in effect, the viewer may "walk around" the borehole and see the intersection line between the borehole and the strata interferenc from several selective positions. In this manner, a view on the display unit 50 may be seen from a direction along a line rotated approximately 45° counterclockwise from the reference direction A which is coincident with the strike direction of the stratum 21. The pattern of inflection points forming on the trace lines on the display unit screen would then appear as the straight line D of FIGURE 2C. Whether a geologist could use such a display as is shown by FIGURE 2C directly for interpting the data in terms of a depositional pattern in the earth's coordinate system would depend on the rate and extent of the variations in instrument orientation that occurred as a result of changing borehole deviation and instrument rotation during logging. Further correction of the hole inclination could best be accomplished by locating the memory unit 32 after the demodulation unit 36. In this position a greater number of recording tracks would be required but by means of movable heads it would be possible to shift the various sensor traces by differing amounts depending on the magnitude and direction of hole inclination. This would be done after the pattern had been established on a stationary display and prior to permanent recording.

I claim as my invention:

1. A method of determining the dip of subterranean earth formations traversed by a borehole comprising the steps of:
   providing a plurality of sensitive elements around the periphery of a circle lying in a plane substantially normal to the axis of said borehole, said sensitive elements being angularly offset from an arbitrary reference direction with respect to the magnetic north direction;
   dividing said circle into as many parallel chordal segments as sensitive elements are provided by drawing a series of chords between respective sensitive elements across the reference circle plane parallel to the arbitrary reference direction;
   moving said plurality of sensitive elements axially along said borehole;
   transmitting an electrical signal proportional to a selected characteristic property of the earth strata adjacent each of said sensitive elements;
   receiving said plurality of electrical signal transmissions at the surface; assigning a base line to each of said sensitive elements;
   visually displaying each of said signals in a viewing plane coincident with said arbitrary reference direction as a separate trace line which laterally deflects about its respective assigned base line;
   aligning each of said base lines adjacently parallel to the others across said viewing plane; and
   arranging said base lines across said viewing plane in the same sequence and spacing as said parallel chordal segments into which said circle is divided.

2. A method as described by claim 1 including the step of providing more than three equally spaced sensitive elements around the periphery of said circle.

References Cited

UNITED STATES PATENTS

| | | | |
|---|---|---|---|
| 2,427,950 | 9/1947 | Doll | 324—10 |
| 2,588,717 | 3/1952 | Goodwin. | |
| 2,823,349 | 2/1958 | French | 324—10 |
| 2,973,472 | 2/1961 | Egan et al. | 324—1 |
| 3,065,405 | 11/1962 | Jarrett | 324—10 XR |
| 3,127,509 | 3/1964 | Swift. | |

FOREIGN PATENTS 685,727   5/1964   Canada.

GERARD R. STRECKER, Primary Examiner

U.S. Cl. X.R.

324—10